United States Patent
Van der Velden

(10) Patent No.: US 10,102,316 B2
(45) Date of Patent: Oct. 16, 2018

(54) VIRTUAL REALITY AUTHORING METHOD

(71) Applicant: Dassault Systemes Simulia Corp., Johnston, RI (US)

(72) Inventor: Alexander Jacobus Maria Van der Velden, Atlanta, GA (US)

(73) Assignee: Dassault Systemes Simulia Corp., Johnston, RI (US)

( * ) Notice: Subject to any disclaimer, the term of this patent is extended or adjusted under 35 U.S.C. 154(b) by 498 days.

(21) Appl. No.: 14/969,341

(22) Filed: Dec. 15, 2015

(65) Prior Publication Data

US 2017/0169142 A1    Jun. 15, 2017

(51) Int. Cl.
  *G06F 17/50* (2006.01)
  *G06T 9/00* (2006.01)

(52) U.S. Cl.
  CPC ...... *G06F 17/5009* (2013.01); *G06F 17/5018* (2013.01); *G06T 9/00* (2013.01)

(58) Field of Classification Search
  CPC .................................................. G06F 17/50
  USPC ................................................ 703/1
  See application file for complete search history.

(56) References Cited

U.S. PATENT DOCUMENTS

| | | | |
|---|---|---|---|
| 7,050,955 B1 * | 5/2006 | Carmel | G06T 19/00 345/418 |
| 7,284,984 B1 | 10/2007 | Zyskowski | |
| 7,991,593 B2 | 8/2011 | Olsen et al. | |
| 8,112,254 B1 * | 2/2012 | Bhat | G06T 19/20 703/1 |
| 8,788,574 B2 | 7/2014 | Beckman et al. | |
| 8,831,926 B2 | 9/2014 | Van Der Velden | |
| 2005/0049838 A1 | 3/2005 | Danko | |
| 2005/0171745 A1 | 8/2005 | Breitfeld et al. | |

(Continued)

FOREIGN PATENT DOCUMENTS

| | | |
|---|---|---|
| CN | 104 299 259 A | 1/2015 |
| WO | WO 2006/088429 A1 | 8/2006 |
| WO | WO 2010/022762 A2 | 3/2010 |

OTHER PUBLICATIONS

Hardy, Rolland L., "Multiquadratic Equations of Topography and Other Irregular Surfaces," J. Geophysics Res., 76(8): 1905-1915, Mar. 1971.

(Continued)

*Primary Examiner* — Andy Ho
(74) *Attorney, Agent, or Firm* — Armstrong Teasdale LLP

(57) ABSTRACT

An embodiment provides a virtual reality experience by defining a model representing an object that includes experimental parameters. After defining the model, a model simulation is performed, using variations of the experimental parameters, that produces results for each of the one or more variations. The results include a value for a behavior of interest of the model for each of the variations. Next, the results are compressed to an interpolant comprising discrete polytope bins with continuous surrogates of the behavior of interest. Responsive to user provided values of the experimental parameters, a value of the behavior of interest is predicted using the interpolant. In turn, a virtual reality experience is provided by displaying to the user an effect on the model for the user-provided values of the one or more experimental parameters where the displayed effect on the model reflects the predicted value for the behavior of interest.

20 Claims, 13 Drawing Sheets

(56) References Cited

U.S. PATENT DOCUMENTS

| | | |
|---|---|---|
| 2008/0181303 A1 | 7/2008 | Andam et al. |
| 2008/0228744 A1 | 9/2008 | Desbiens |
| 2010/0197401 A1 | 8/2010 | Altshuler et al. |
| 2011/0024125 A1 | 2/2011 | Wallace et al. |
| 2014/0267228 A1 | 9/2014 | Ofek et al. |
| 2014/0274373 A1* | 9/2014 | Olshan .............. G06T 13/40 463/31 |
| 2016/0179992 A1 | 6/2016 | Van der Velden |
| 2017/0169142 A1 | 6/2017 | Van Der Velden |
| 2017/0293705 A1 | 10/2017 | Van der Velden et al. |

OTHER PUBLICATIONS

Finite Element Analysis—FEA and Simulation Software—SIMULIA—Dassault Systèmes, Jul. 2013, Retrieved from the Internet URL: http://www.3ds.com/products-services/simulia/overview/.

Fraunhofer SCAI: FEMZIP, Oct. 2013, Retrieved from the Internet URL: http://www.scai.fraunhofer.de/geschaeftsfelder/numerische-software/produkte/femzip.html?&L=1.

Optimal design—Wikipedia, Dec. 2005, Retrieved from the Internet URL: http://en.wikipedia.org/wiki/Optimal_design.

Response surface methodology—Wikipedia, Sep. 2006, Retrieved from the Internet URL: https://en.wikipedia.org/wild/Response_surface_methodology.

Sirovich, Lawrence, "Turbulence and the Dynamics of Coherent Structures Part I: Coherent Structures," Quart. Appl. Math., 45(3):561-571, Oct. 1987.

Sirovich, Lawrence, "Turbulence and the Dynamics of Coherent Structures Part II: Symmetries and Transformations," Quart. Appl. Math., 45(3):573-582, Oct. 1987.

Sirovich, Lawrence, "Turbulence and the Dynamics of Coherent Structures Part III: Dynamics and Scaling," Quart. Appl. Math., 45(3):583-590, Oct. 1987.

Klein, Vladislav, and Murphy, Patrick C., "Aerodynamic Parameters of High Performance Aircraft Estimated from Wind Tunnel and Flight Test Data," NASA-98-AGARD, p. 18-1 through 18-20, May 1998.

Jolliffe, I.T., "Principal Component Analysis," Series: Springer Series in Statistics, 2nd ed., Springer, NY, p. 1-6, (table of contents included only), Oct. 2002.

Van der Velden, A., Koch, P., Devanathan, S., Haan, J., Naehring, D., and Fox, D., "Probabilistic Certificate of Correctness for Cyber Physical Systems," ASME 2012 International Design Engineering Technical Conferences & Computers and Information in Engineering Conference, Aug. 12-15, Chicago, IL, USA, DETC2012-70135, Aug. 2012.

Functional Mock-up Interface (FMI) website, Jul. 2015 (Functional Mock-up Interface 1.0 available on Jan. 2010), retrieved from the Internet URL: http://www.fmi-standard.org/start.

Functional Mock-up Interface for Model Exchange, version 1.0, Jan. 2010, MODELISAR (07006), retrieved from the Internet URL: https://svn.modelica.org/fmi/branches/public/specifications/v1.0/FMI_for_ModelExchange_v1.0.pdf, 56 pages.

Design of Experiments—Wikipedia, Dec. 2003, retrieved from the Internet URL: http://en.wikipedia.org/wiki/Design_of_experiments.

VRML97 The Virtual Reality Modeling Language, International Standard ISO/IEC 14772-1:1997, The VRML Consortium Incorporated, (1997).

EPO Extended Search Report for related application 17164711.8 dated Sep. 18, 2017; 10 pp.

Azuma, Ronald et al., "Recent Advances in Augmented Reality," IEEE Computer Graphics and Applications, New York, NY, vol. 21, No. 6, Dec. 1, 2001, pp. 34-46.

Tuceryan, Mihran et al., "Calibration Requirements and Procedures for a Monitor-Based Augmentd Reality System," IEEE Transactions on Visualization and Computer Graphics, Los Alamitos, CA, vol. 1, No. 3, Sep. 1, 1995, 19 pp.

Roth-Tabak, Yuval et al., "Building an Environment Model Using Depth Information," IEEE Computer Society, vol. 22, No. 6, Jun. 1, 1989, pp. 85-90.

Extended European Search Report for Application No. 16204088.5; Dassault Systemes Simulia Corp.; dated May 12, 2017; 7 pages.

Deng, Jian, "Structural reliability analysis for implicit performance function using radial basis function network." International Journal of Solids and Structures 43.11-12 (2006): 3255-3291 (Year: 2006).

Lang, Yi-Dong, et al. "Reduced order model based on principal component analysis for process simulation and optimization." Energy & Fuels 23.3 (2009): 1695-1706. (Year: 2009).

European Search Report for EP Application No. 15201084.9, titled: Interactive 3D Experiences on the Basis of Data, Date of Completion: Feb. 25, 2016.

Crowell, A.R. et al., "Surrogate Based Reduced-Order Aerothermodynamic Modeling for Structural Response Prediction at High Mach Numbers," $52^{nd}$ AIAA/ASME/ASCE/AHS/ASC Structures, Structural Dynamics and Materials Conference, Apr. 2011 (26 pages).

Qian, Z. et al., "Building Surrogate Models Based on Detailed and Approximate Simulations," Journal of Mechanical Design, vol. 128, pp. 668-675 (Jul. 2006).

Deshmukh AP, Allison JT, "Design of Nonlinear Dynamic Systems Using Surrogate Models of Derivative Functions". ASME. International Design Engineering Technical Conferences and Computers and Information in Engineering Conference, vol. 38: 39th Design Automation Conferencc( ):V03BT03A011. doi:1 0.1115/DETC2013-12262, Aug. 2013.

T. Blochwitz, M. Otter, M. Arnold, C. Bausch, C. GlauB, H. Elmqvist, A. Junghanns, J. Mauss, M. Monteiro, T. Neidhold, D. Neumerkel, H. Olsson, J.-V. Peetz, S. Wolf, "The Functional Mockup Interface for Tool independent Exchange of Simulation Models". Proceedings of the 8th Modelica Conference, Dresden, Germany, Mar. 20-22, 2011.

Microsoft, "Why Microsoft HoloLens," https://www.microsoft.com/microsoft-hololens/en-us/why-hololens, retrieved from the internet Apr. 28, 2016, 15 pages.

* cited by examiner

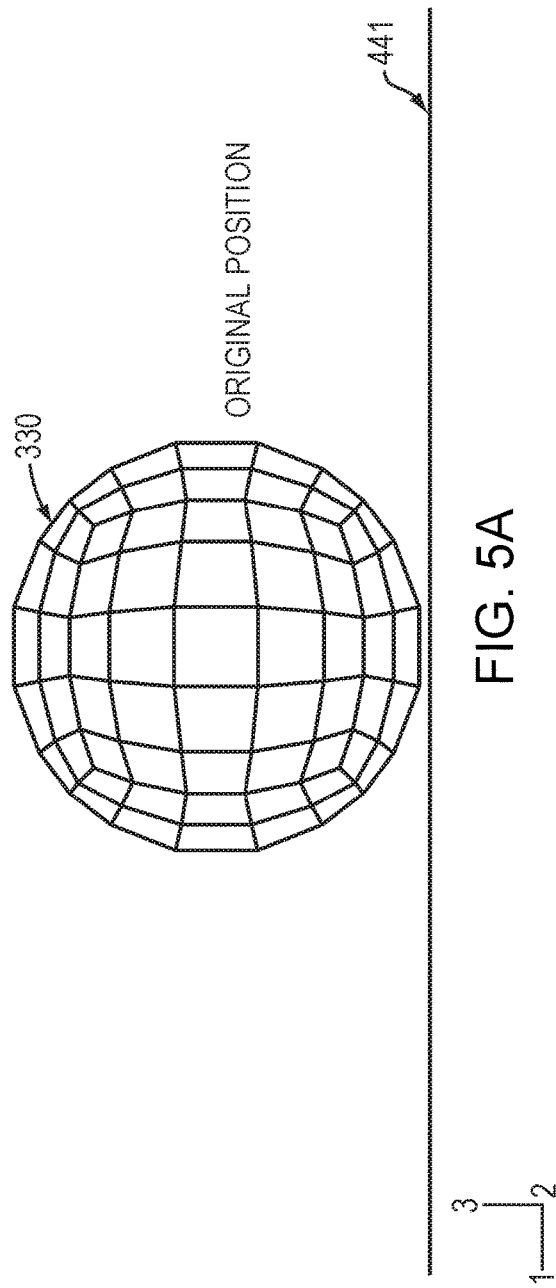
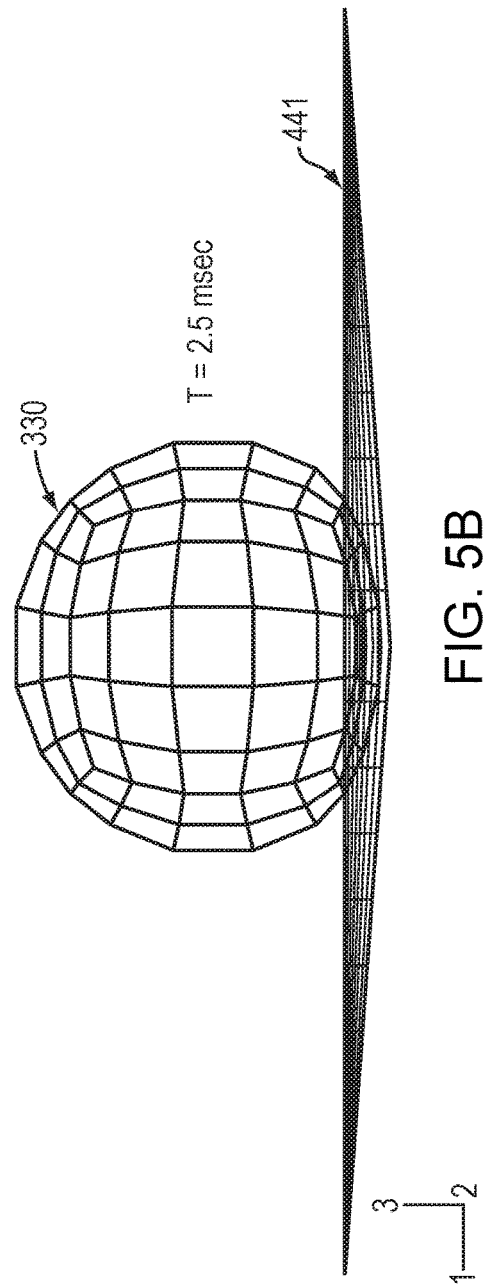

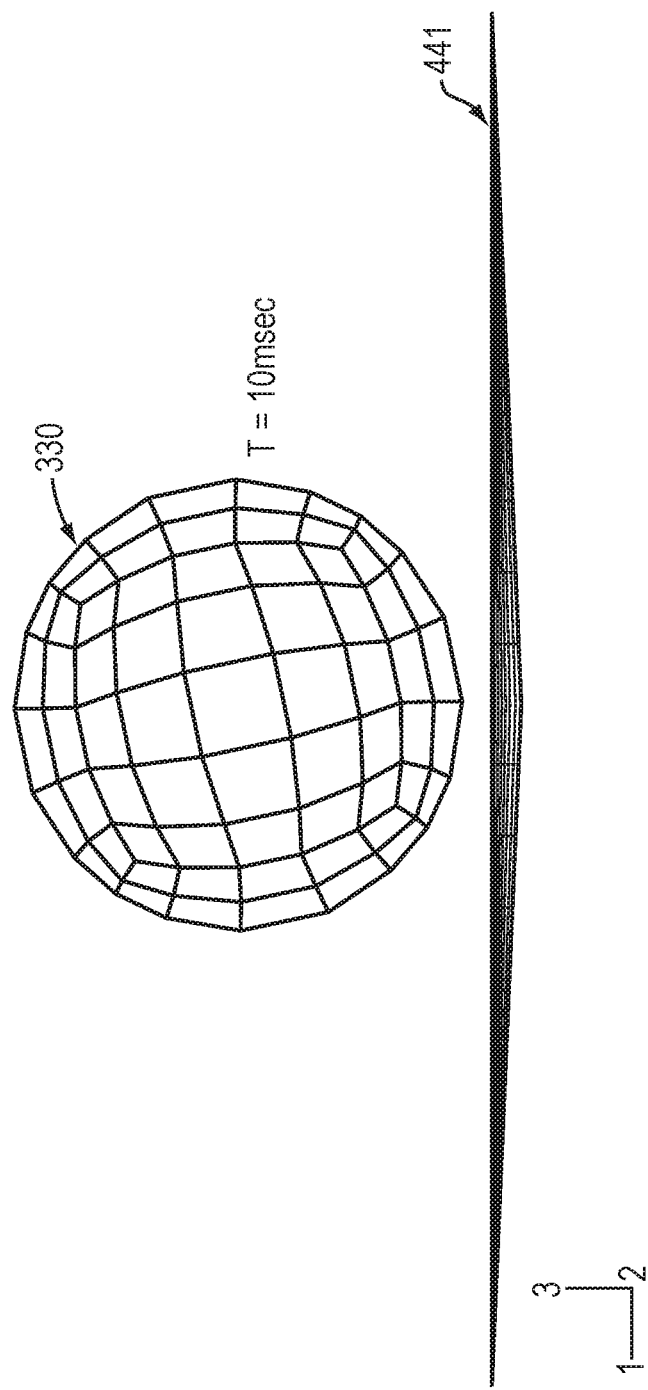

VIRTUAL REALITY AUTHORING METHOD

BACKGROUND

Embodiments of the invention generally relate to the field of computer programs and systems and specifically to the field of product design and simulation. Embodiments of the invention may be employed in video games, engineering system design, collaborative decision making, and entertainment, e.g., movies.

A number of existing product and simulation systems are offered on the market for the design and simulation of parts or assemblies of parts. Such systems typically employ computer aided design (CAD) and/or computer aided engineering (CAE) programs. These systems allow a user to construct, manipulate, and simulate complex three-dimensional models of objects or assemblies of objects. These CAD and CAE systems, thus provide a representation of modeled objects using edges or lines, in certain cases with faces. Lines, edges, faces, or polygons may be represented in various manners, e.g. non-uniform rational basis-splines (NURBS).

These CAD systems manage parts or assemblies of parts of modeled objects, which are mainly specifications of geometry. In particular, CAD files contain specifications, from which geometry is generated. From geometry, a representation is generated. Specifications, geometry, and representations may be stored in a single CAD file or multiple CAD files. CAD systems include graphic tools for representing the modeled objects to designers; these tools are dedicated to the display of complex objects. For example, an assembly may contain thousands of parts. A CAD system can be used to manage models of objects, which are stored in electronic files.

The advent of CAD and CAE systems allows for a wide range of representation possibilities for objects. One such representation is a finite element analysis (FEA) model. The terms FEA model, finite element model (FEM), finite element mesh, and mesh are used interchangeably herein. A FEM typically represents a CAD model, and thus, may represent one or more parts or an entire assembly. A FEM is a system of points called nodes which are interconnected to make a grid, referred to as a mesh. The FEM may be programmed in such a way that the FEM has the properties of the underlying object or objects that it represents. When a FEM or other such object representation as is known in the art is programmed in such a way, it may be used to perform simulations of the object that it represents. For example, a FEM may be used to represent the interior cavity of a vehicle, the acoustic fluid surrounding a structure, and any number of real-world objects. Moreover, CAD and CAE systems along with FEMs can be utilized to simulate engineering systems. For example, CAE systems can be employed to simulate noise and vibration of vehicles.

These existing simulation/experiment techniques are not without their drawbacks. A primary issue with such existing methodologies is the time they take to execute. This time prevents the existing methods from being practical methodologies, for example, to be used in virtual reality.

SUMMARY OF THE INVENTION

Embodiments of the present invention overcome problems with existing methodologies and provide methods and system that provide a virtual reality experience. Embodiments of the invention further improve various fields, including simulation results compression, co-simulation, physical abstractions (models) for system engineering, and video games, amongst others.

According to at least one example embodiment, a method for providing a virtual reality experience begins by defining, in computer memory, a model representing an object, the model including one or more experimental parameters. After defining the model, a model simulation is performed, by a processor coupled to the memory, using one or more variations of the one or more experimental parameters. Performing the simulation produces respective results for each of the one or more variations, where the respective results include a respective value for a behavior of interest of the model for each of the one or more variations. Next, the results are compressed to an interpolant that includes discrete polytope bins with continuous surrogates of the behavior of interest. To continue, responsive to user provided values of the one or more experimental parameters, a value of the behavior of interest is predicted using the interpolant given the user provided values. In turn, a virtual reality experience is provided to the user by displaying to the user an effect on the model for the user-provided values of the one or more experimental parameters where the displayed effect on the model reflects the predicted value for the behavior of interest.

According to an embodiment of the present invention, the model is at least one of: a computer aided engineering (CAE) model, a finite element model, a finite volume model, a computational fluid dynamics model, and a multibody dynamics model.

Another embodiment further comprises concatenating the respective results for each of the one or more variations of the experimental parameters into one file and storing the one file in a database. Further still, in yet another embodiment, there are a plurality of behaviors of interest and the respective results from performing the simulation produces a respective value for each behavior of the plurality of behaviors of interest for each of the one or more variations of the experimental parameters. Said method embodiment compresses the results in parallel for each behavior of the plurality of behaviors of interest. In yet another embodiment, the behavior of interest includes at least one of: a spatial position of an element of the model, time, and a physical behavior of the model.

An embodiment of the method further comprises optimizing faces of the polytope bins, resulting in an improved compression of the results. In yet another embodiment, the surrogates may be any surrogates known in the art such as polynomials or radial basis functions. According to an embodiment, the polytope bins comprise similar results data. Further, in another embodiment of the method, the polytope bins have faces defined with the at least one or more experimental parameters, the behavior of interest, a transform of the one or more experimental parameters, a transform of the behavior of interest, a time, or spatial coordinates.

An alternative embodiment of the present invention is directed to a computer system for providing a virtual reality experience. Such a computer system comprises a processor and memory with computer code instructions stored thereon where the processor and the memory with the computer code instructions are configured to cause the system to implement the various embodiments described herein. In one such embodiment, the processor and the memory with the computer code instructions cause the system to: define, in computer system memory, a model representing an object, the model including one or more experimental parameters and perform a model simulation using one or more variations of the one or more experimental parameters where performing the simulation produces results that include a respective value for a behavior of interest of the model for each of the one or more variations. Further, in such a computer system embodiment, the processor and the memory with the computer code instructions further cause the system to compress the respective results to an interpolant including discrete polytope bins with continuous surrogates of the behavior of interest. Moreover, the system, responsive to user provided values of the one or more experimental parameters, predicts a value for the behavior of interest given the user-provided values using the interpolant. Using the predicted value, the system provides a virtual reality experience to the user by displaying to the user an effect on the model for the user-provided values of the one or more experimental parameters.

According to an embodiment of the computer system, the model is at least one of a CAE model, a finite element model, a finite volume model, a computation fluid dynamics model, and a multibody dynamics model. In another embodiment of the computer system, the process and the memory, with the computer code instructions are further configured to cause the system to concatenate the respective results for each of the one or more variations of the experimental parameters into one file and store the one file in a database.

In yet another computer system embodiment, there are a plurality of behaviors of interest and the respective results from performing the simulation produces a respective value for each behavior of the plurality of behaviors of interest for each of the one or more variations of the experimental parameters. Further, in such an embodiment, the processor and the memory, with the computer code instructions, are further configured to cause the system to compress the results in parallel for each behavior of the plurality of behaviors of interest. According to an embodiment, the behavior of interest includes at least one of: a spatial position of an element of the model, time, and a physical behavior of the model.

In a further computer system embodiment, according to the principles of the present invention, the processor and the memory, with the computer code instructions are further configured to cause the system to optimize faces of the polytope bins to effect an improved compression of the result. According to an embodiment of the computer system, the surrogates are at least one of a polynomial and a radial basis function. According to yet another embodiment, the polytope bins comprise similar results data. Further still, in another computer system embodiment, the polytope bins have faces defined with the at least one or more experimental parameters, the behavior of interest, a transform of the one or more experimental parameters, a transform of the behavior of interest, a time, or spatial coordinates.

Another embodiment of the present invention is directed to a cloud computing implementation for providing a virtual reality experience. Such an embodiment is directed to a computer program product executed by a server in communication across a network with one or more clients, where the computer program product comprises a computer readable medium. In such an embodiment, the computer readable medium comprises program instructions which, when executed by a processor, causes: defining in computer system memory, a model representing an object, the model including one or more experimental parameters and performing a model simulation using one or more variations of the one or more experimental parameters, where performing the simulation produces respective results for each of the one or more variations, the respective results including a respective value for a behavior of interest of the model for each of the one or more variations. Moreover, in such an embodiment, the program instructions, when executed by the processor, further cause compressing the respective results to an interpolant including discrete polytope bins with continuous surrogates of the behavior of interest, responsive to user provided values of the one or more experimental parameters, predicting a value for the behavior of interest given the user-provided values, and further, providing a virtual reality experience to the user by displaying to the user an effect on the model for the user-provided values of the one or more experimental parameters, the displayed effect on the model reflecting the predicted value for the behavior of interest.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 5A-F depict a virtual reality experience at various points in time that may be provided using principles of an example embodiment.

DETAILED DESCRIPTION OF THE INVENTION

Figure 1:
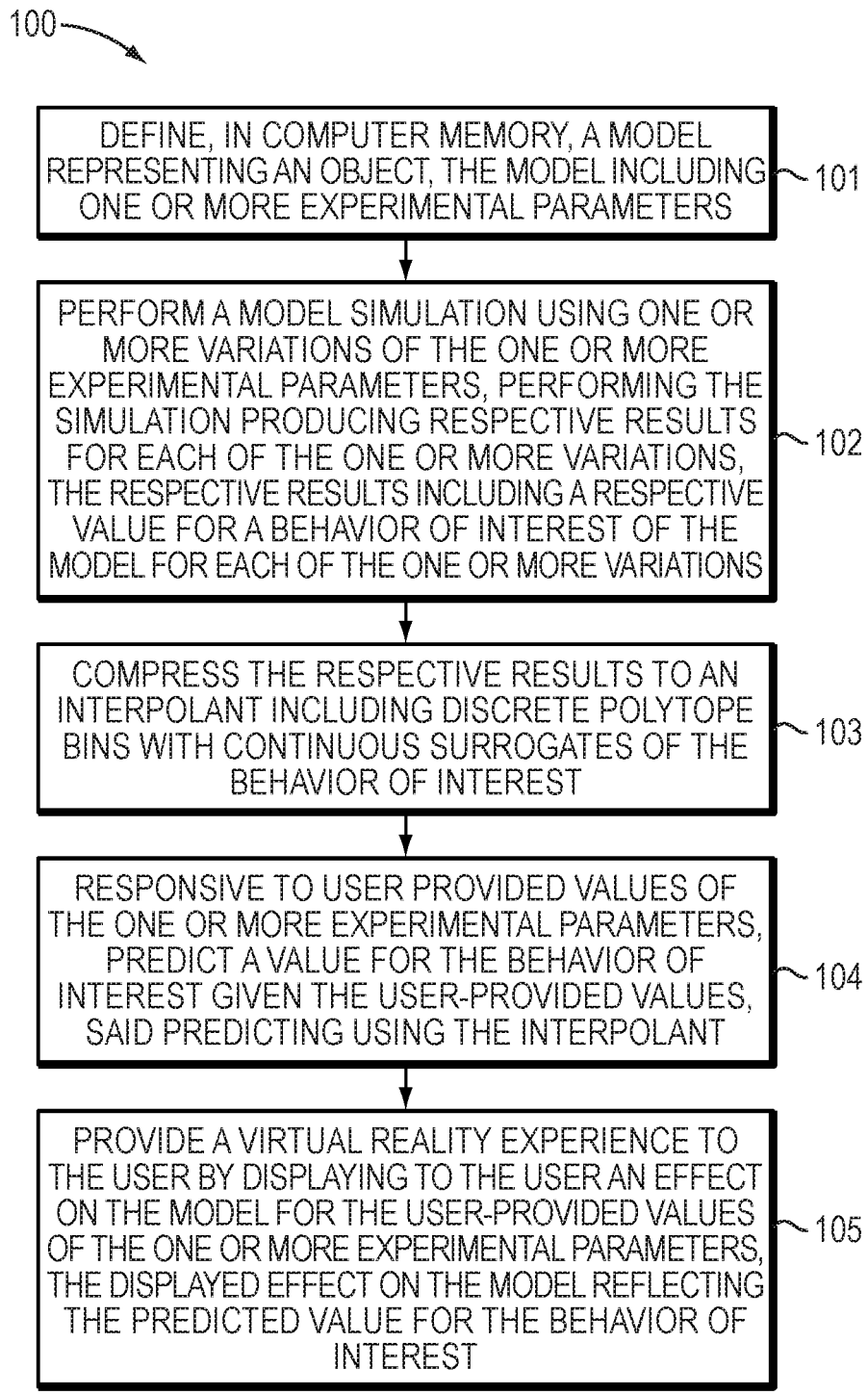
FIG. 1 is a flowchart of a computer implemented method for providing a virtual reality experience according to at least one example embodiment.

A description of example embodiments of the invention follows.

The teachings of all patents, published applications and references cited herein are incorporated by reference in their entirety.

Embodiments of the present invention provide a virtual reality experience. In providing such an experience, embodiments create a real or virtual experiment whereby a behavior of interest (e.g., spatial position of the nodes of objects such as in VRML, CAD object, or mesh; time; and/or physical behavior such as temperature or stress) for a variety of scenarios of interest (i.e., design of experiments) is determined. According to an embodiment, the data is concatenated into one data file in the form of instance rows with columns of data types (e.g., time, object node coordinates, or behavior value). A file describing such an interactive experience trace for just a few seconds can easily be on the order of 10-100 gigabytes.

Using existing methods, decompressing and interpolating this data over tens of thousands of spatial nodes for each time frame is very slow, especially with techniques such as "nearest neighbor," whereby interpolation is done with values that have the nearest Euclidean distance. Such an interpolation may take many seconds, thus, rendering it impractical for real time or near real time virtual reality experiences.

While methodologies exist for data compression and for providing virtual reality experiences, such as Van der Velden, U.S. patent application Ser. No. 14/574,843, Andam et al., U.S. Patent Publication No. 2008/0181303 A1, and VRML 97 Specification: International Standard ISO/IEC 14722: Virtual Reality Modeling Language, these methods cannot provide a real time or near real time virtual reality experience as efficiently as embodiments of the present invention. For instance, Van der Velden U.S. patent application Ser. No. 14/574,843 operates best with limited datasets (~10,000 instances) of unique, temporal, spatial, and input even states. Further, Andam, U.S. Patent Publication No. 2008/0181303 describes a compression technique that is limited to temporal and 2D spatial data (i.e., video)

Andam, for example at paragraph [0025], describes a method whereby pixels of similar color values are grouped together into polygons defined by mathematical equations in order to exponentially decrease the size of video. Embodiments of the present invention expand on this approach by defining suitable n-dimensional polytopes to bin similar data where the polytope edge coordinates can be defined as any parameter or transforms of parameters, such as time, nodes, or behavior. Further, embodiments of the present invention provide functionality to create an approximation, such as a polynomial, radial basis function, etc., of the behavior of interest for the data binned in the aforementioned fashion.

Embodiments of the present invention utilize regression techniques that scale to $~N^3$. Thus, in an example, if N=1000 samples each with 1000 regressions, such a regression implementation is a million times more efficient than one regression of 1,000,000 samples. Further, embodiments can improve on the accuracy of the compression by optimizing the coordinates of the polytopes and selecting the type of surrogate model for each behavior of interest. In embodiments, surrogates can be made directly with time as a variable whereby the prediction is made as a function of the time stamp, or as a set of non-linear ordinary differential equations (as in Van der Velden U.S. patent application Ser. No. 14/574,843), whereby time is integrated numerically. The very high compression ratios that can be achieved using embodiments of the present invention, i.e., 1:100 to 1:10,000, can be utilized to provide real-time prediction of interactive 3D experiences of field behavior such as deformations, temperatures, or motion.

FIG. 1 is a flow chart of a method 100 for providing a virtual reality experience according to an embodiment of the present invention. The method 100 begins at step 101 by defining, in computer memory, a model representing an object where the model includes one or more experimental parameters. According to an embodiment of the method 100, the model is defined in response to user interaction. For example, the user may define/construct the model and provide a variety of data regarding the object that the model represents using techniques known in the art. This may include programming the model in such a way that it conforms to all of the parameters of a real-world object. For instance, the model may be programmed to have any properties of the object the model represents, such as the dimensions, mass, and stiffness of the represented object, amongst other examples. The model may be any model known in the art that can be programmed accordingly to be used in a simulation. In other words, according to an embodiment, the model may represent a behavior of said object. Example models include a computer aided engineering (CAE) model, a finite element model, a finite volume model, a computational fluid dynamics model, and a multibody dynamics model. Further, the defined model may also be in the form of an equation or system of equations that can represent the various properties of the object that the model represents. Examples include algebraic equations, ordinary differential equations, and partial differential equations.

As noted herein, the model defined at step 101 includes experimental parameters. According to an embodiment, the experimental parameters are any such parameters that one is investigating, wants to visualize using the virtual reality experience provided by the method 100, and/or that are needed in performing the simulation, such as parameters defining conditions of the experience/simulation. Example experimental parameters include: time, spatial coordinates of elements of the model, and any variety of characteristics of the model that are varied in performing the model simulation at step 102.

To continue, after defining the model at step 101, a model simulation is performed at step 102. The simulation is performed at step 102 for one or more variations of the one or more experimental parameters. Further, performing the simulation produces respective results for each of the one or more variations where the results include respective values for a behavior of interest of the model for each of the one or more variations. Embodiments of the present invention may determine results for any number of behaviors of interest. In such an embodiment, performing the simulation at step 102 produces a respective value for each behavior of the plurality of behaviors of interest for each of the one or more variations of the experimental parameters. According to an embodiment of the method 100, the behavior of interest includes at least one of a spatial position of an element of the model, time, and a behavior of the model, such as a physical behavior. Another embodiment of the method 100 further comprises concatenating the results from the simulation performed at step 102 into one file and further, storing the one file in a database. In an embodiment, the simulation is performed according to principles known in the art.

To further illustrate step 102, consider a simplified example where the model is a tennis ball and a tennis racquet and the experimental parameters include the location of the ball, time, and thickness of the ball. In the simulation the experimental parameters of time and ball location are varied to simulate the ball hitting the racquet and the results of this simulation for example, may include the pressure inside the ball and deformation of the ball over time. In such an example, the results of the simulation include one or more behaviors of interest such as the pressure inside the ball and/or deformation of the ball at the various times and locations of the racquet and ball. Thus, in an embodiment, the results provide data for a behavior of interest as a function of time and space.

After performing the simulation at step 102, the simulation results are then compressed at step 103. In an embodiment, the simulation results are compressed to an interpolant that includes discrete polytope bins with continuous surrogates of the behavior of interest. According to an embodiment, the interpolant is a function for the behavior of interest generated using the results of the simulation performed at step 102. In an embodiment, the interpolant, i.e., function, comprises polytope bins which are defined by inequality constraints where each bin has a continuous surrogate of the behavior of interest. The continuous surrogates provide a value for the behavior of interest given experimental parameters that correspond to each surrogate's polytope bin.

According to an embodiment, each polytope bin comprises similar results data. For instance, in the tennis ball example, one bin may include results data before the ball and racquet collide and another bin may include results from when the ball and racquet are in contact. The continuous surrogates may be any regression known in the art, such as a polynomial or a radial basis function. Further, in an alternative embodiment, the surrogate type varies according to the data in each particular bin, thus ensuring that the best surrogate is used. According to an embodiment, cross-validation or set-aside validation techniques are used to determine the best surrogate to use for each particular bin. In yet another embodiment, compressing the results at step 103, comprises compressing the behavior of interest data to the interpolant with the discrete polytope bins.

As noted hereinabove, there may be a plurality of behaviors of interest. In such an embodiment, performing the simulation at step 102 produces a respective value for each behavior of the plurality of behaviors of interest for each of the one or more variations of the experimental parameters. Further, such an embodiment, at step 103, may compress the results in parallel for each of the plurality of behaviors of interest.

According to an embodiment of the method 100, the polytope bins have faces defined with at least or more experimental parameters, the behavior of interest, a transform of the one or more experimental parameters, a transform of the behavior of interest, time, or spatial coordinates. An alternative embodiment of the method 100 further includes optimizing the compression performed at step 103 by optimizing faces of the polytope bins. In yet another embodiment, the polytope bins are represented by inequality constraints and the compression at step 103 is improved by aligning the polytope bins to any discontinuity of the behavior of interest which may be due to the physics or geometry of the experiment. In an example, the inequalities representing the polytope bins are refined so that data prior to the discontinuity event belongs in one bin, and data during the event goes in another bin. To illustrate using the tennis ball and racquet example, the inequalities representing the polytope bins may be defined such that data when the ball is in flight prior to hitting the racquet is in one bin and data when the ball is in contact with the racquet is in another bin.

At step 104, in response to user provided values of the one or more experimental parameters, a value for the behavior of interest is predicted for the provided values using the interpolant. To illustrate, going back to the aforementioned tennis ball example, the user may provide a value of the thickness of the tennis ball along with various times and positions of the ball and racquet (the experimental parameters) and in response, the value of the pressure inside the tennis ball and the deformation of the ball (the behaviors of interest) with the provided thickness may be determined in time and space using the interpolant at step 104.

To continue, the method 100 provides at step 105 a virtual reality experience to the user by displaying an effect on the model for the user-provided values of the one or more experimental parameters where the displayed effect on the model reflects the predicted value of the behavior of interest determined at step 104. As noted hereinabove, because the value of the behavior of interest may for example, be determined as a function of time and space, the provided virtual reality experience may similarly reflect the behavior of interest in time and space. According to an embodiment, this virtual reality experience may be provided to a user through any means known in the art, e.g. by displaying an animation of the model given the parameters and predicted values of the behavior determined according to principles described herein. For instance, once again returning to the tennis ball example, providing the virtual reality experience at step 105 may display the location of the ball and racquet at a variety of times and may illustrate the varying pressure inside ball, for example, through color shading. In an embodiment, the virtual reality experience may be provided using a file comprising bins and surrogates models as described herein. According to an embodiment, providing the virtual reality experience may be implemented using any virtual reality file format for the data as is known in the art or any virtual reality format that one may define. Example virtual reality file formats include VRML, X3D, WebGL, U3D, O3D. Further detail regarding providing a virtual reality experience is described herein below in relation to FIGS. 5A-F.

Figure 2:
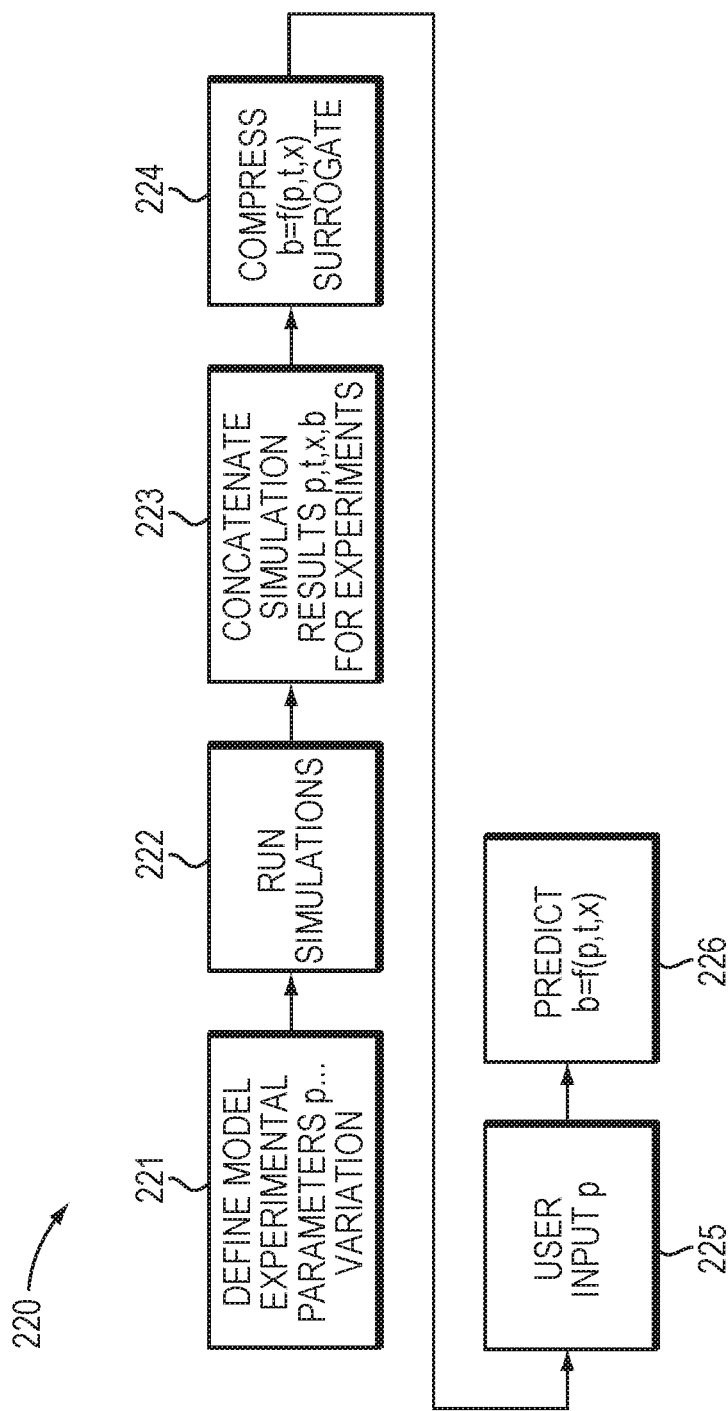
FIG. 2 depicts a virtual reality authoring method according to an example embodiment.

Embodiments of the present invention utilize an experiment whereby a behavior of interest is tracked for a variety of scenarios of interest (design of experiments) and, in turn, the data is concatenated into one data file. According to an embodiment, a behavior of interest may be a spatial position of the nodes of an object (e.g., VRML, CAD, or mesh), time, or a physical behavior (temperature, stress). FIG. 2 shows a workflow 220 for providing a virtual reality experience using a finite element prototype simulation. The workflow 220 begins by defining model parameters and variations of those parameters at step 221. Next, a simulation is run at step 222 for each of the model variations, each of which produces an output of time, spatial location of nodes, and behavior of interest. According to embodiment of the workflow 220, simulations may be performed at step 222 for each experimental parameter (p). According to an embodiment of the workflow 220, the simulations at step 222 can be performed in parallel for every sample of the parameter of interest (p) using a computer cluster. At step 223, the results including the parameter (p), time (t), position (x), and behavior of interest (b) from the simulation performed at step 222 are concatenated into a file. In turn, a compression method reduces the results dataset to an interpolant comprising discrete polytope bins with continuous surrogates of the behavior field of interest (b). In an embodiment, the compression at step 224 may be run in parallel on a computer cluster for every behavior field (b) of interest. After performing steps 221-224, the workflow 220 can now in real time, in response to a user provide value of the parameter at step 225, interpolate the field data (b) as a function of time, space, and the user provided values to predict the value of the behavior of interest at step 226. The ability to predict a value of the behavior of interest in real time allows the workflow 220 and/or one or more steps thereof to be used in providing a virtual reality experience.

Figure 3:
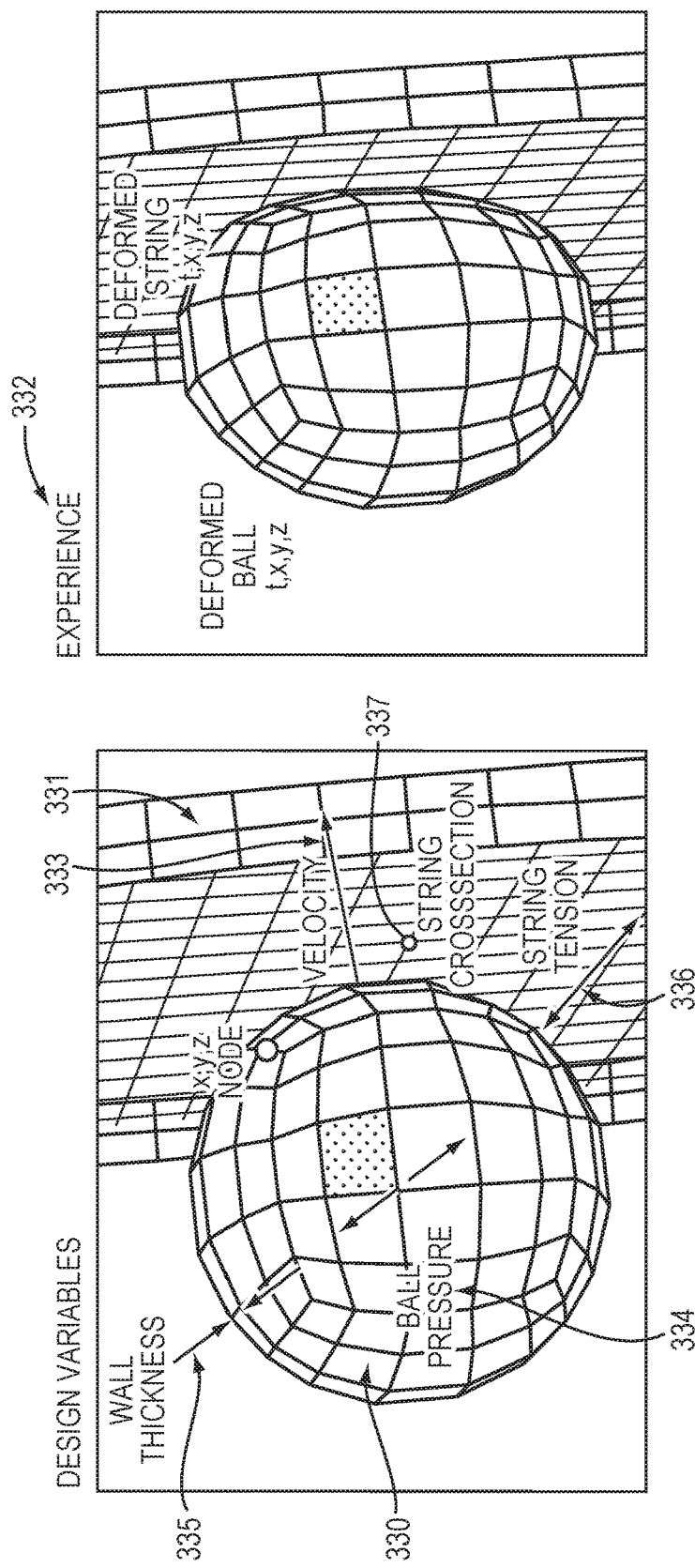
FIG. 3 illustrates a model with design variables and a virtual reality experience of the model according to an embodiment.

FIG. 3 illustrates how embodiments of the present invention, such as the method 100 and the workflow 220 are applied to the interaction of a tennis ball 330 and a racquet 331 each with particular (x,y,z) geometry nodes. Utilizing principles of the present invention, a virtual reality experience 332 can be provided illustrating the ball 330 hitting or otherwise colliding with the racquet 331 with different experimental parameters (p) such as speeds 333, ball pressures 334, ball wall thicknesses 335, string tensions 336, and string cross-sections 337. Depending on these parameters (333-337), the ball and racquet deformation and trajectory behavior (b) varies significantly. The non-linear interaction is short, e.g. 10 ms, and causes severe deformation in the ball 330 as shown in the virtual reality experience 332.

Utilizing principles described herein, millions of computer observations of time, nodes, and behavior can be compressed into thousands of expressions of the form:

IF {location function (p, time, nodes) inside polytope space} THEN b=function (p, time, nodes)}

In such an embodiment, the polytope hyperdimensional location coordinates can be expressed abstractly as "time," "time*time," or Y coordinate node*Ball pressure. These polytope coordinates are abstract and can be selected to minimize the error of the fixed form regression of the behaviors of interest (b). Consider the example with the two parameters of time and velocity, where distance equals time*velocity. In such an example of the tennis ball and racquet example, the time for the ball to hit the racquet from a location depends on the distance the ball has to travel. While in free flight, the data is in one bin and when the ball and racquet make contact, the data can go into another bin. The two bins can be constrained by the inequalities time*velocity<X contact and time*velocity>X contact. The regression error in such an example is minimized by utilizing this combination to delineate the bins.

In the implemented virtual reality experience, any number of polytope bins may be used. For example, in implementing the experience 332, 100 polytope space bins are used with a full second order regression model of the deformation to create a 0.1% accurate compression for the ball 330 and racquet 331 interaction. Such a methodology makes it possible to interactively study the variation of the parameters 333-337 on the deformation behavior (b) of the ball 330. In other words, users can vary the variety of parameters 333-337 and view the results in real time using principles of the present invention. Existing methods cannot provide such functionality and are limited by the complexity of the interaction of the parameters on the behavior of interest.

Figure 4:
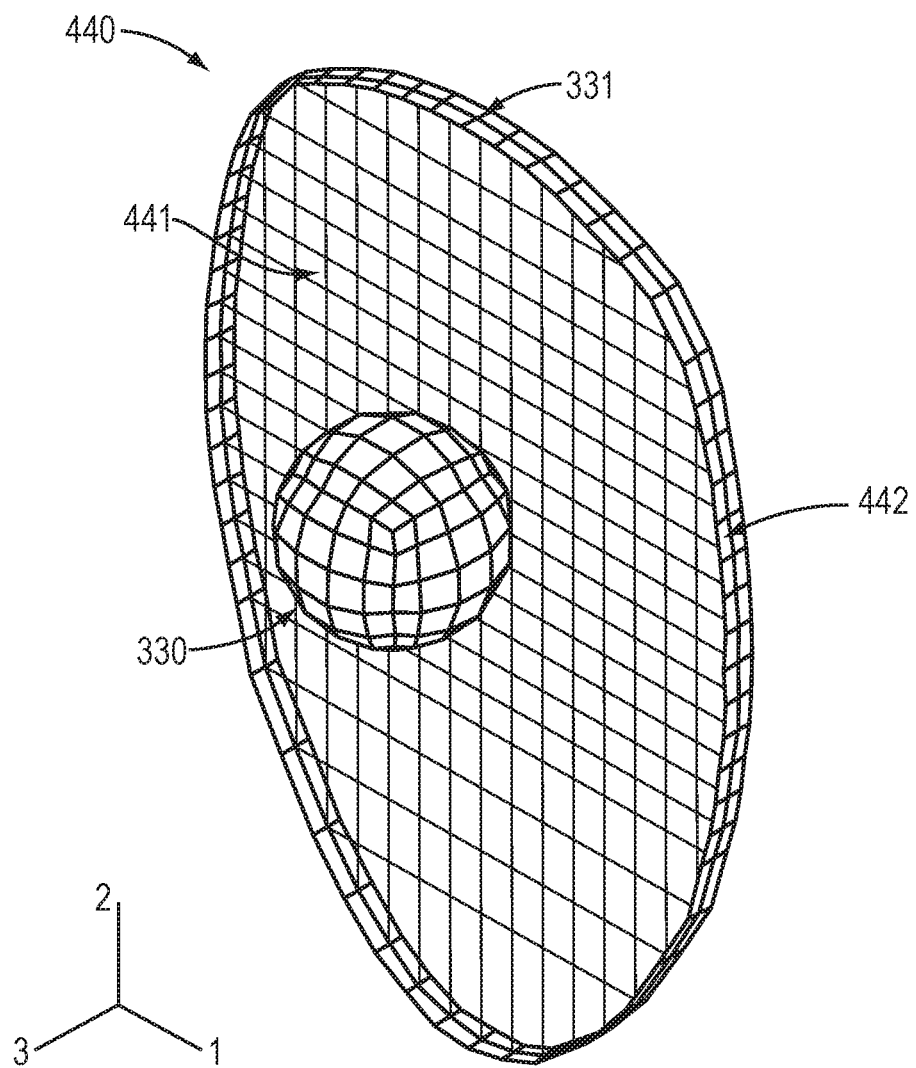
FIG. 4 depicts a model that may be used in an embodiment.

As noted herein, embodiments of the present invention define a model that includes one or more parameters and perform a simulation producing results that can include values for a plurality of behaviors of interest. Herein below, a variety of experimental parameters, behaviors of interest and simulation/experiment conditions are described in the context of the tennis ball and racquet example. It is noted that the below examples are non-limiting and embodiments may provide a virtual reality experience of a wide variety of objects and conditions. The example experience 332 simulates the oblique impact of the tennis ball 330 onto a racquet 331 at 6.706 m/sec (264 in/sec). The example illustrates contact between a deforming surface and a node set, with defined initial conditions and modeling of a fluid cavity filled with a compressible gas. FIG. 4 depicts the complete model 440 of the ball 330 and racquet 331. In the model 440, the racquet strings 441 are modeled using truss elements and are assumed to be linear elastics with a Young's modulus of 6.895 GPa ($1.0 \times 10^6$ psi), Poisson's ratio of 0.3, and density of 1143 kg/m$^3$ ($1.07 \times 10^{-4}$ lb sec$^2$in$^{-4}$). The strings 441 are under an initial tension 44.48 N (10 lb).

The frame 442 of the racquet 331 is assumed to be rigid and is modeled using finite elements. The nodes of the strings (truss elements) around the perimeter are the same nodes as those used for the R3D4 elements. The reference node for the rigid frame has boundary conditions applied to constrain all six degrees of freedom on the rigid body so that the frame 442 does not move.

The tennis ball 330 is modeled as a sphere, using finite shell elements. It is assumed to be made of rubber, modeled as a Mooney-Rivlin material with the constants $C_{10}$=0.690 MPa (100 lb/in$^2$) and $C_{01}$–0.173 MPa (25 lb/in$^2$). In the results shown by FIGS. 5A-5F and FIGS. 6-8, $D_1$=0.0145 MPa$^{-1}$ (10$^{-4}$ psi$^{-1}$). This gives an initial bulk modulus ($K_0$=2/$D_1$) that is 80 times the initial shear modulus 2($C_{10}$+$C_{01}$). This ratio is lower than the ratio for typical rubbers, but the results are not particularly sensitive to this value in this case because the rubber is unconfined. A more accurate representation of the material's compressibility would be needed if the rubber were confined by stiffer adjacent components or reinforcement. Decreasing $D_1$ by an order of magnitude (thus increasing the initial bulk modulus by a factor of 10) has little effect on the overall results but causes a reduction in the stable time increment by a factor of $\sqrt{10}$ due to the increase in the bulk modulus. The density of the tennis ball 330 is 1068 kg/m$^3$ ($1.07 \times 10^{-4}$ lb sec$^2$in$^{-4}$).

The tennis ball 330 is under an initial internal pressure of 41 kPa (6 psi) in addition to the ambient atmospheric pressure of 100 kPa (14.7 psi). An element-based surface is defined on the inside of the tennis ball 330. This surface is used to define a fluid cavity filled with gas and the properties of the gas inside the tennis ball 330 are defined using the molecular weight of the gas and capacity of the ball 330. For the results illustrated in 5A-5F and FIGS. 6-8 the molecular weight and molar heat capacity of the gas are chosen as 0.062 kg (0.1367 lb) and 28.110 J/kg ° K (112.847 lb in/lbm ° K). Since the ball 330 is impermeable to gas, the pressure of the gas will rise when the volume of the ball 330 decreases, and vice versa. Static equilibrium gives the value of the initial biaxial membrane stresses in the shell elements of the sphere as pr/2t=155 kPa (22.5 psi) to balance the internal pressure (here p is the internal gas pressure 334, r is the radius of the sphere, and t is the tennis ball thickness 335). This initial state of stress in the ball is defined using principles known in the art.

Further, in the model 440, a coefficient of friction of 0.1 is specified between the ball 330 and the strings 441. The ball 330 impacts on the strings 441 at 6.706 m/sec (264 in/sec) at an angle of 15°. The problem is also analyzed by modeling the gas in the tennis ball 330 with hydrostatic fluid elements. The fluid density is chosen to be one-tenth that of rubber under an ambient pressure of 100 kPa (14.7 psi). The complete model 440 is shown in FIG. 4 and the model 440 has 2241 degrees of freedom.

An element-based surface is defined on the tennis ball 330. Further, since the truss elements are line elements, they do not form a planar surface. A node-based surface is defined that contains all the nodes of the strings 441. The contact between the element-based surface of the ball 330 and any of the nodes defined in the node-based surface is also defined. An input file that uses the general contact methodology as is known in the art is also utilized.

Figure 5C:
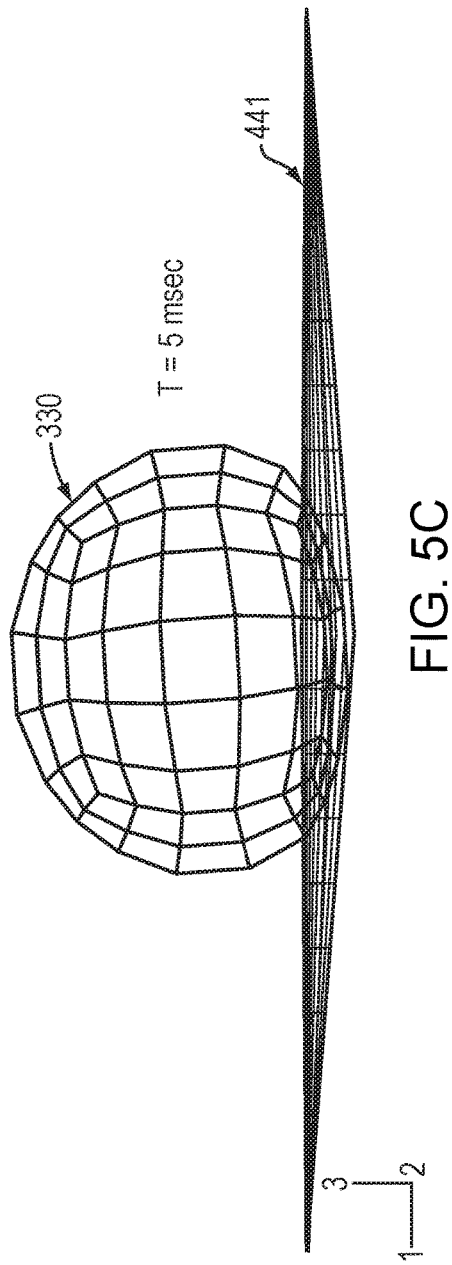
Figure 5D:
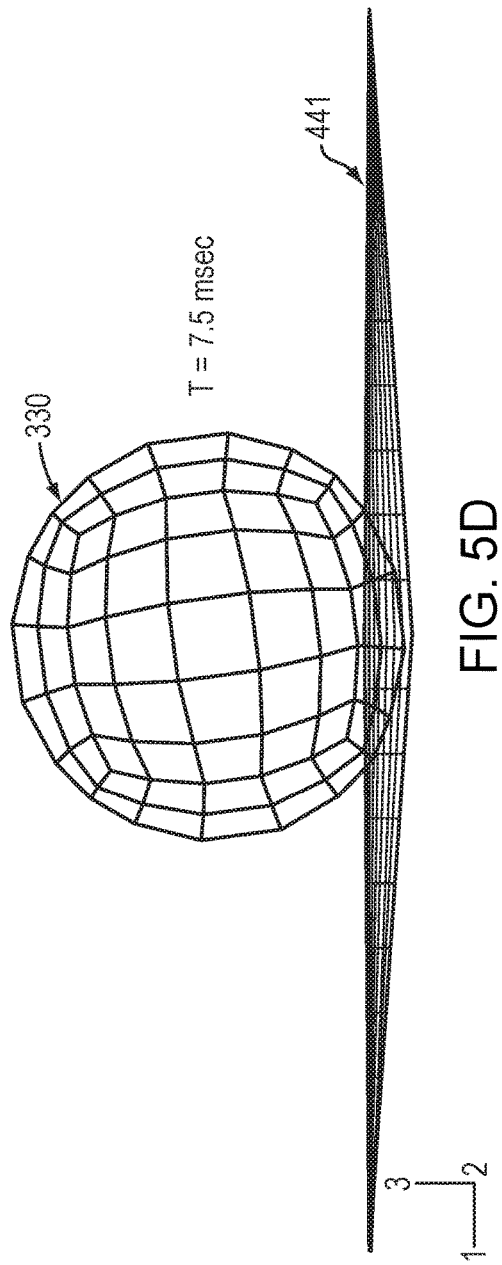
Figure 5F:
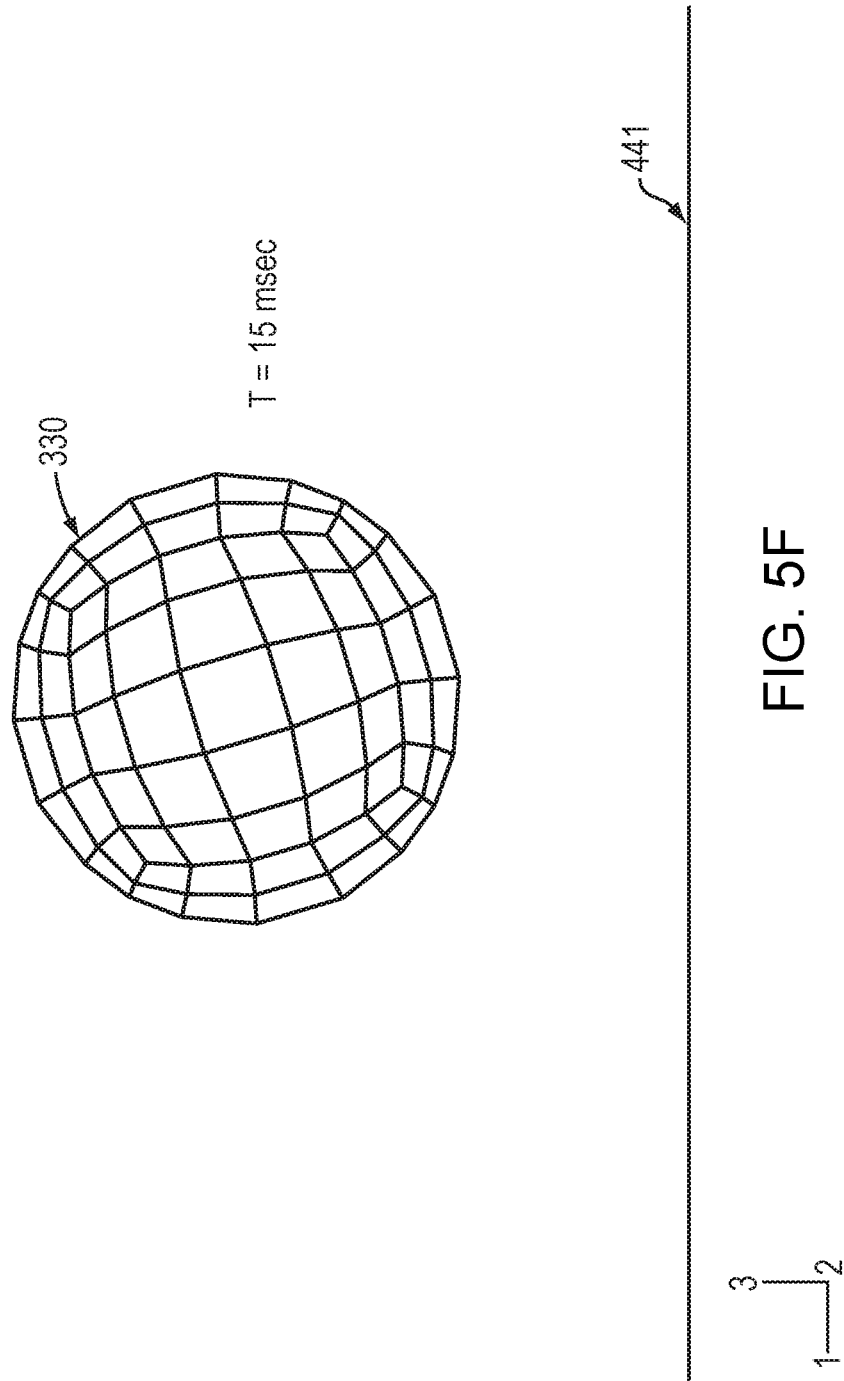

FIGS. 5A-F show the ball 330 with respect to the strings 441 at various points in time. FIG. 5A shows the ball 330 with respect to the strings 441 in the un-deformed original position. FIGS. 5B-F show the ball 330 and strings 441 at different stages of the analysis, specifically, t=2.5 ms, t=5 ms, t=7.5 ms, t=10 ms, and t=15 ms respectively.

Using the principles of the present invention, a user can vary any number of parameters of the model 440, such a ball thickness 335, and see the changes in the virtual reality experience, where the interaction between the ball 330 and the strings 441 varies depending on the value of the thickness parameter.

Figure 6:
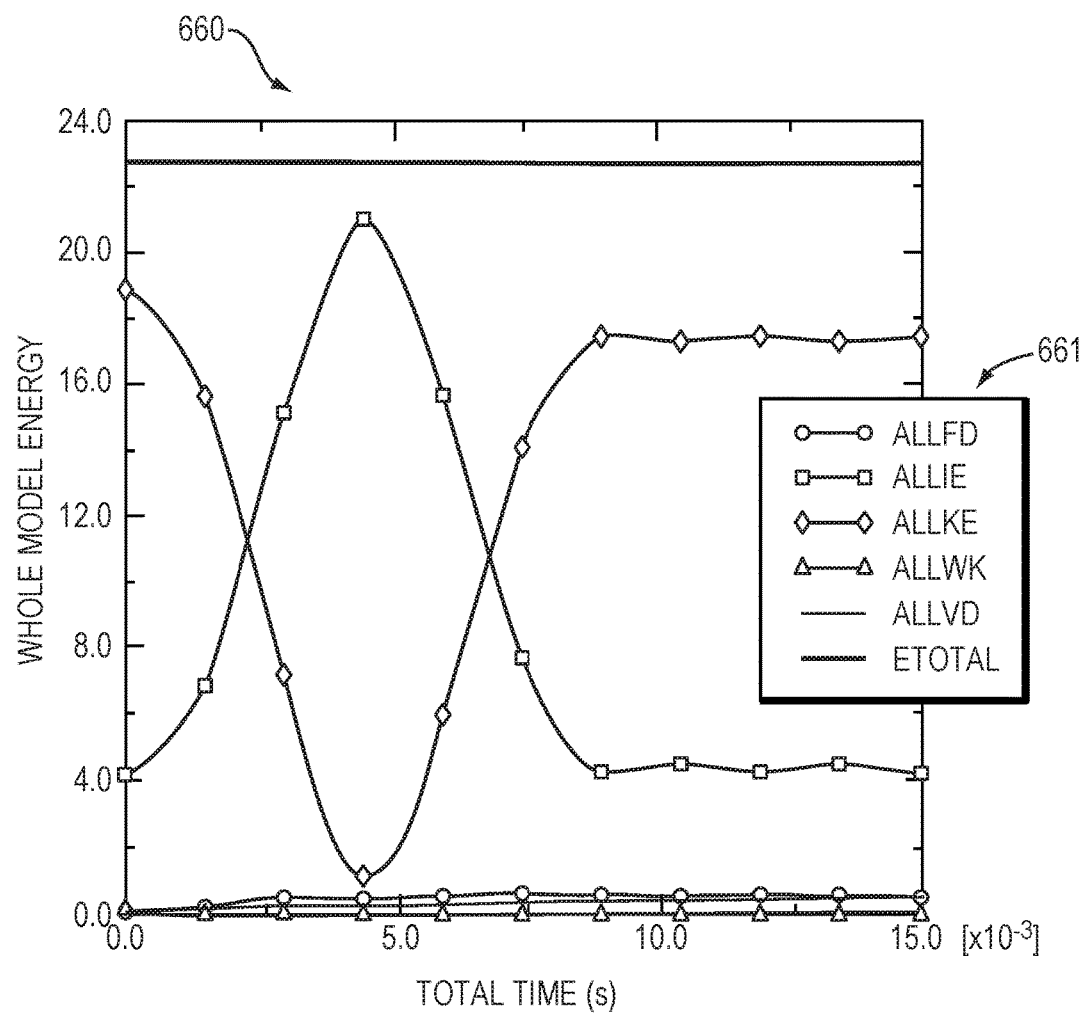
FIG. 6 is a graph of a model parameter that may be determined using principles of embodiments of the present invention.
Figure 7:
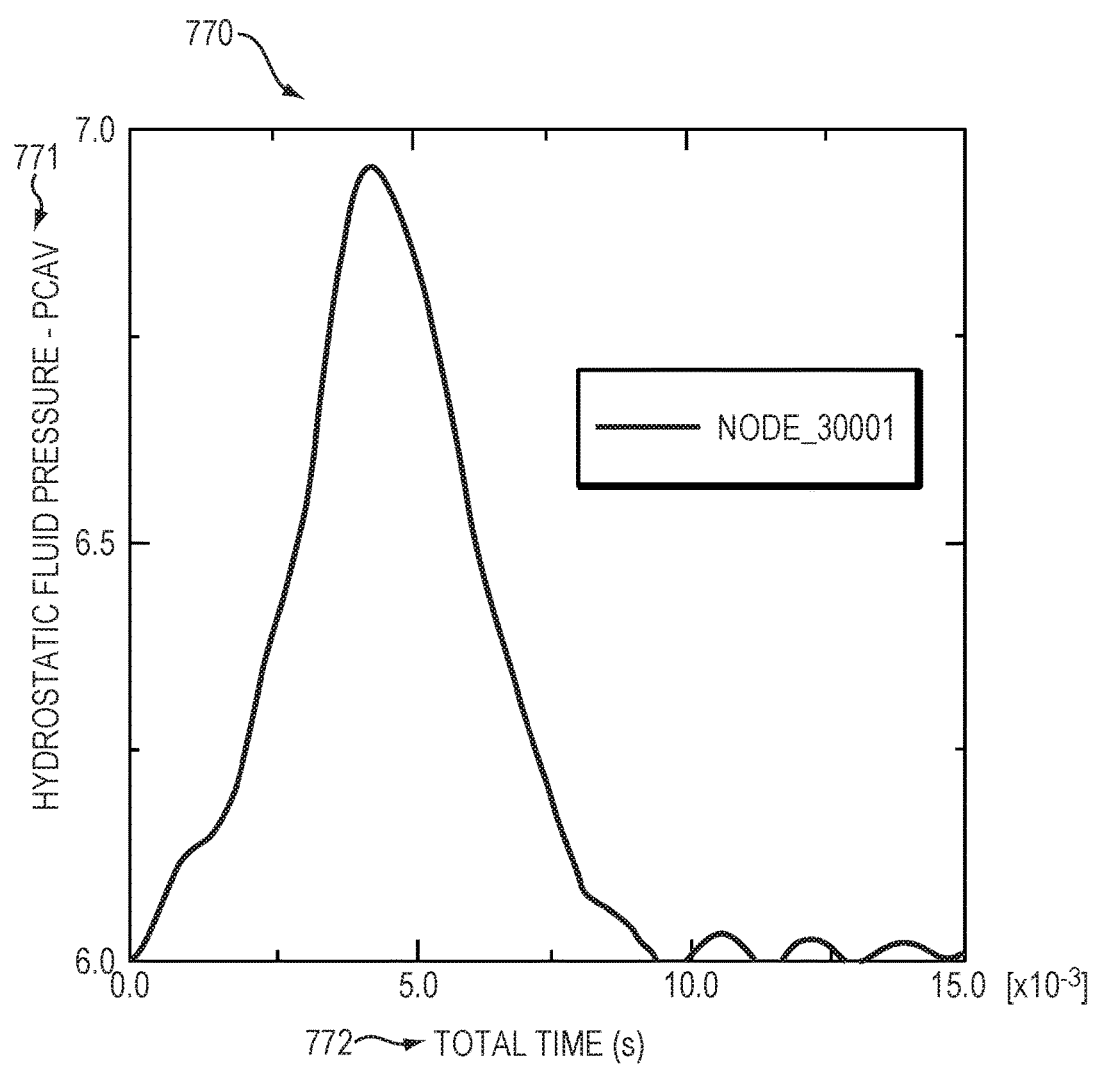
FIG. 7 is a graph of a model parameter determined using principles of an embodiment.
Figure 8:
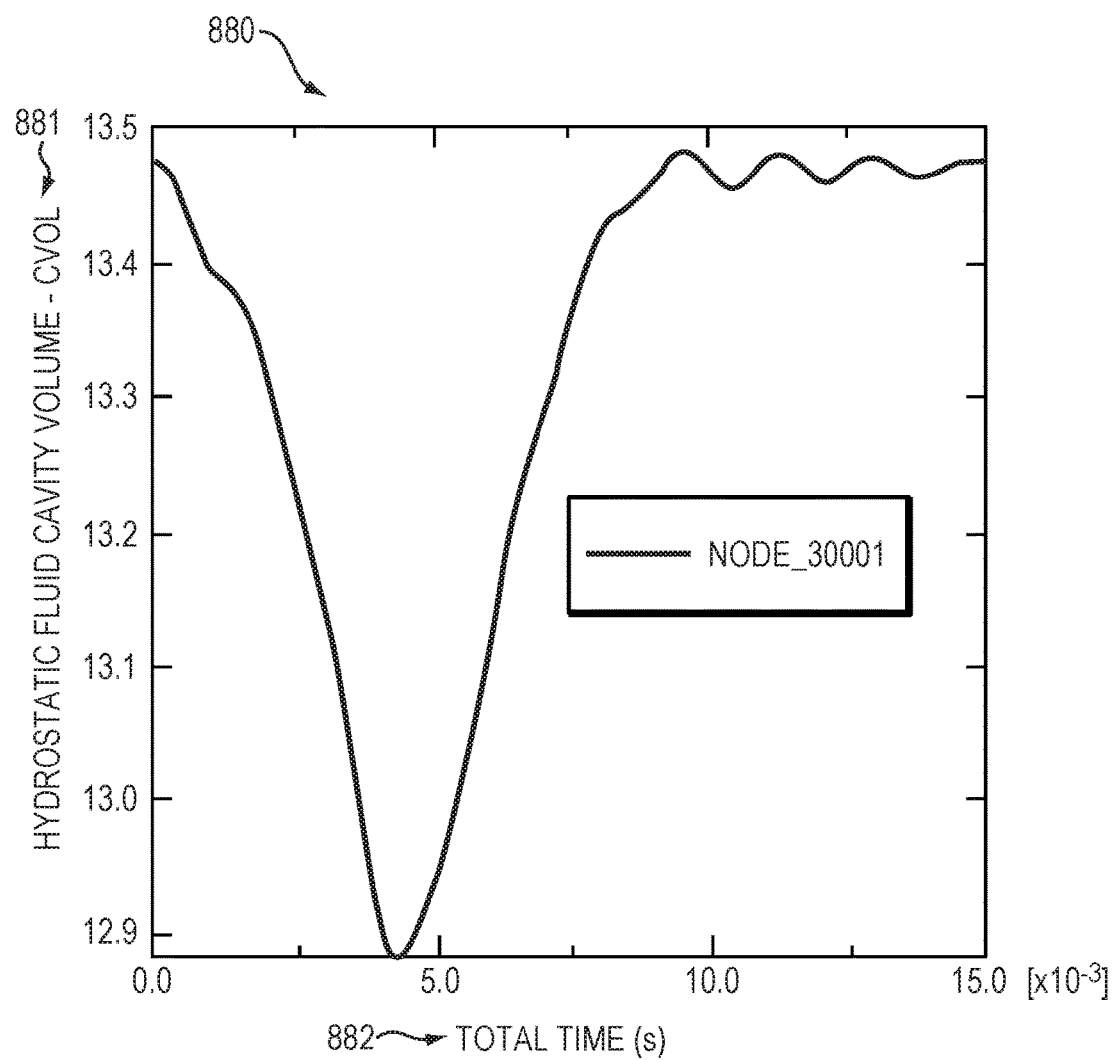
FIG. 8 shows a graph of a parameter calculated according to an embodiment of a method of the present invention.

In addition to the virtual reality experience, such as the experience provided by FIGS. 5A-F, embodiments can provide feedback on the change in the model 440 in real-time in the form of a graph. FIG. 6 illustrates the graph 660 which depicts the time history of the energies 661 of the model. These energies 661 include the total internal energy (ALLIE), the kinetic energy (ALLKE), the viscous dissipation (ALLVD), the energy dissipated by friction (ALLFD), the external work (ALLWK), and the total energy balance for the model (ETOTAL). The total energy remains almost constant during the analysis, as it should. Any behaviors of interest and changes to those behaviors in the simulation for different experimental parameters can also be provided in the form of graph. FIG. 7 shows the graph 770 which depicts the pressure inside the ball 771 over time 772. Further, FIG. 8 shows the graph 880 which illustrates the volume 881 of the ball over time 882.

Figure 9:
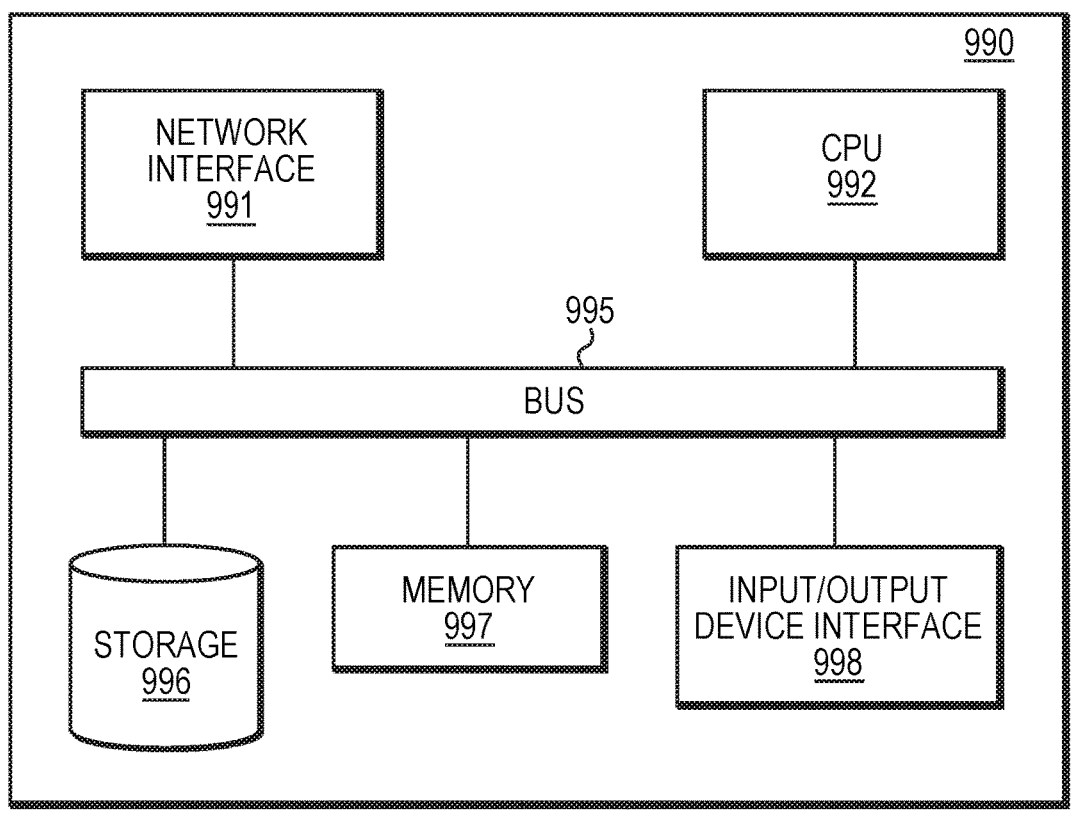
FIG. 9 is a simplified block diagram of a computer system for providing a virtual reality experience according to an embodiment.

FIG. 9 is a simplified block diagram of a computer-based system 990 that may be used to provide a virtual reality experience according to an embodiment of the present invention. The system 990 comprises a bus 995. The bus 995 serves as an interconnect between the various components of the system 990. Connected to the bus 995 is an input/output device interface 998 for connecting various input and output devices such as a keyboard, mouse, display, speakers, etc. to the system 990. A central processing unit (CPU) 992 is connected to the bus 995 and provides for the execution of computer instructions. Memory 997 provides volatile storage for data used for carrying out computer instructions. Storage 996 provides non-volatile storage for software instructions, such as an operating system (not shown). The system 990 also comprises a network interface 991 for connecting to any variety of networks known in the art, including wide area networks (WANs) and local area networks (LANs).

It should be understood that the example embodiments described herein may be implemented in many different ways. In some instances, the various methods and machines described herein may each be implemented by a physical, virtual, or hybrid general purpose computer, such as the computer system 990, or a computer network environment such as the computer environment 1000, described herein below in relation to FIG. 10. The computer system 990 may be transformed into the machines that execute the methods (e.g., 100 and 220) described herein, for example, by loading software instructions into either memory 997 or non-volatile storage 996 for execution by the CPU 992. One of ordinary skill in the art should further understand that the system 990 and its various components may be configured to carry out any embodiments of the present invention described herein. Further, the system 990 may implement the various embodiments described herein utilizing any combination of hardware, software, and firmware modules operatively coupled, internally, or externally, to the system 990.

Figure 10:
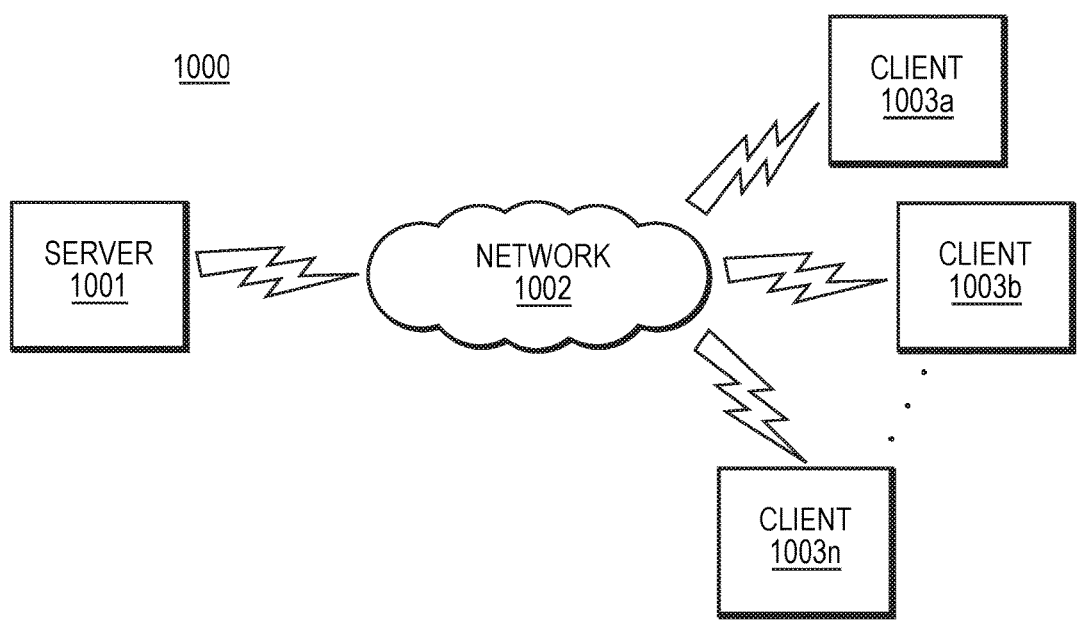
FIG. 10 is a simplified diagram of a computer network environment in which an embodiment of the present invention may be implemented.

FIG. 10 illustrates a computer network environment 1000 in which an embodiment of the present invention may be implemented. In the computer network environment 1000, the server 1001 is linked through the communications network 1002 to the clients 1003a-n. The environment 1000 may be used to allow the clients 1003a-n, alone or in combination with the server 1001, to execute any of the methods (e.g., 100) described hereinabove.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and networks diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus, the data processors described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A computer implemented method for providing a virtual reality experience, the method comprising:

defining, in computer memory, a model representing an object, the model including one or more experimental parameters;

by a processor coupled to the computer memory:

performing a model simulation using one or more variations of the one or more experimental parameters, performing the simulation producing respective results for each of the one or more variations, the respective results including a respective value for a behavior of interest of the model for each of the one or more variations;

compressing the respective results to an interpolant including discrete polytope bins with continuous surrogates of the behavior of interest;

responsive to user-provided values of the one or more experimental parameters, predicting a value for the behavior of interest given the user-provided values, said predicting using the interpolant; and providing a virtual reality experience to a user by displaying to the user an effect on the model for the user-provided values of the one or more experimental parameters, the displayed effect on the model reflecting the predicted value for the behavior of interest.

2. The method of claim 1 wherein the model is at least one of:
   a computer aided engineering model (CAE);
   a finite element model;
   a finite volume model;
   a computational fluid dynamics model; and
   a multibody dynamics model.

3. The method of claim 1 further comprising:
   concatenating the respective results for each of the one or more variations of the experimental parameters into one file; and
   storing the one file in a database.

4. The method of claim 1 wherein there are a plurality of behaviors of interest and the respective results from performing the simulation produces a respective value for each behavior of the plurality of behaviors of interest for each of the one or more variations of the experimental parameters, the method further comprising:
   compressing the results in parallel for each behavior of the plurality of behaviors of interest.

5. The method of claim 1 wherein the behavior of interest includes at least one of:
   a spatial position of an element of the model;
   time; and
   a physical behavior of the model.

6. The method of claim 1 further comprising:
   optimizing faces of the polytope bins, optimizing the faces resulting in an improved compression of the results.

7. The method of claim 1 wherein the surrogates are at least one of:
   a polynomial; and
   a radial basis function.

8. The method of claim 1 wherein the polytope bins comprise similar results data.

9. The method of claim 1 wherein the polytope bins have faces defined with the at least one or more experimental parameters, the behavior of interest, a transform of the one or more experimental parameters, a transform of the behavior of interest, a time, or spatial coordinates.

10. A computer system for providing a virtual reality experience, the computer system comprising:
    a processor; and
    a memory with computer code instructions stored thereon, the processor and the memory, with the computer code instructions being configured to cause the system to:
    define, in computer system memory, a model representing an object, the model including one or more experimental parameters;
    perform a model simulation using one or more variations of the one or more experimental parameters, performing the simulation producing respective results for each of the one or more variations, the respective results including a respective value for a behavior of interest of the model for each of the one or more variations;
    compress the respective results to an interpolant including discrete polytope bins with continuous surrogates of the behavior of interest;
    responsive to user-provided values of the one or more experimental parameters, predict a value for the behavior of interest given the user-provided values, said predicting using the interpolant; and
    provide a virtual reality experience to a user by displaying to the user an effect on the model for the user-provided values of the one or more experimental parameters, the displayed effect on the model reflecting the predicted value for the behavior of interest.

11. The computer system of claim 10 wherein the model is at least one of:
    a computer aided engineering (CAE) model;
    a finite element model;
    a finite volume model;
    a computational fluid dynamics model; and
    a multibody dynamics model.

12. The computer system of claim 10 wherein the processor and the memory, with the computer code instructions are further configured to cause the system to:
    concatenate the respective results for each of the one or more variations of the experimental parameters into one file; and
    store the one file in a database.

13. The computer system of claim 10 wherein there are a plurality of behaviors of interest and the respective results from performing the simulation produces a respective value for each behavior of the plurality of behaviors of interest for each of the one or more variations of the experimental parameters and further, where the processor and the memory, with the computer code instructions are configured to cause the system to:
    compress the results in parallel for each behavior of the plurality of behaviors of interest.

14. The computer system of claim 10 wherein the behavior of interest includes at least one of:
    a spatial position of an element of the model;
    time; and
    a physical behavior of the model.

15. The computer system of claim 10 wherein the processor and the memory, with computer code instructions are further configured to cause the system to:
    optimize faces of the polytope bins resulting in an improved compression of the results.

16. The computer system of claim 10 wherein the surrogates are at least one of:
    a polynomial; and
    a radial basis function.

17. The computer system of claim 10 wherein the polytope bins comprise similar results data.

18. The computer system of claim 10 wherein the polytope bins have faces defined with the at least one or more experimental parameters, the behavior of interest, a transform of the one or more experimental parameters, a transform of the behavior of interest, a time, or spatial coordinates.

19. A computer program product for providing a virtual reality experience, the computer program product executed by a server in communication across a network with one or more clients and comprising:
    a computer readable medium, the computer readable medium comprising program instructions which, when executed by a processor causes:
    defining, in computer system memory, a model representing an object, the model including one or more experimental parameters;
    performing a model simulation using one or more variations of the one or more experimental parameters, performing the simulation producing respective results for each of the one or more variations, the respective results including a respective value for a behavior of interest of the model for each of the one or more variations;
    compressing the respective results to an interpolant including discrete polytope bins with continuous surrogates of the behavior of interest;

responsive to user-provided values of the one or more experimental parameters, predicting a value for the behavior of interest given the user-provided values, said predicting using the interpolant; and providing a virtual reality experience to a user by displaying to the user an effect on the model for the user-provided values of the one or more experimental parameters, the displayed effect on the model reflecting the predicted value for the behavior of interest.

20. The computer program product of claim 19 wherein there are a plurality of behaviors of interest and the respective results from performing the simulation produces a respective value for each behavior of the plurality of behaviors of interest for each of the one or more variations of the experimental parameters, and where the computer readable medium comprises program instructions which, when executed by the processor, further causes:

compressing the results in parallel for each behavior of the plurality of behaviors of interest.

* * * * *